US006425060B1

(12) United States Patent
Mounes-Toussi et al.

(10) Patent No.: US 6,425,060 B1
(45) Date of Patent: Jul. 23, 2002

(54) CIRCUIT ARRANGEMENT AND METHOD WITH STATE-BASED TRANSACTION SCHEDULING

(75) Inventors: Farnaz Mounes-Toussi, Minneapolis; Donald Lee Freerksen, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,883

(22) Filed: Jan. 5, 1999

(51) Int. Cl.[7] .............................................. G06F 12/00

(52) U.S. Cl. ......................... 711/158; 711/144; 711/151

(58) Field of Search .................................. 711/144, 146, 711/151, 158

(56) References Cited

U.S. PATENT DOCUMENTS 5,155,843 A * 10/1992 Stamm et al. .................. 714/5
5,893,160 A * 4/1999 Loewentein et al. ......... 711/152
5,930,819 A * 7/1999 Hetherington et al. ...... 711/131
6,000,012 A * 12/1999 Freerksen et al. ........... 711/118

FOREIGN PATENT DOCUMENTS

EP          0817077 A2     1/1998

OTHER PUBLICATIONS

Allen, Michael et al. "A High Performance Bus and Cache Controller for PowerPC Multiprocessing Systems". Computer Design: VLSI in Computers and Processors, ICCD, 1995; pp. 204–211.*
Saini, Subhash et al., *NAS Parallel Benchmarks Results 3–95*, Report NAS–95–011, (Apr. 1995), pp. 1–16, 4–16, and 5–16.

Woo, Steven Cameron et al., "The SPLASH–2 Programs: Characterization and Methodological Considerations", *Proceedings of the 22nd Annual International Symposium on Computer Architecture*, (Jun. 1995), pp. 1 and 3.
Allen, M. S., Alexander, M., Wright, C., Chang, J.; "Designing the PowerPC 60X Bus"; IEEE Micro, vol. 14, No. 5, Oct. 1994, pp. 42–51.
Mounes–Toussi, F., Lilja, D. J.; "The Effect of Using State–Based Priority Information in a Shared–Memory Multiprocessor Cache Replacement Policy"; Technical Report No: HPPC–97–11, Univerity of Minnesota, High–Performance Parallel Computing Research Group, Department of Electrical Engineering, Department of Computer Science, Minneapolis, Minnesota, USA; Nov. 1997, pp. 1–15.
IBM Technical Disclosure Bulletin; "Multiprocessing System Memory Access Queue and Scheduling Apparatus"; vol. 34, No. 12, May 1992.
Allen, M. S., Lewchuk, W. K.; "A Pipelined Weakly Ordered Bus for Multiprocessing Systems"; Digest of Papers, Compcon 95: Technologies for the Information Superhighway, San Francisco, California, USA; Mar. 1995, pp. 292–299; IEEE Comput. Soc. Press.

* cited by examiner

*Primary Examiner*—Reginald G. Bragdon
(74) *Attorney, Agent, or Firm*—Wood, Herron & Evans (57) ABSTRACT

A data processing system, circuit arrangement, and method rely on state information to prioritize certain transactions relative to other transactions when scheduling transactions in a data processing system. In one implementation, as a result of the recognition that in many shared memory systems cached data having a modified state is accessed more frequently than cached data having a non-modified state, transactions associated with modified cached data are prioritized relative to transactions associated with non-modified cached data, thereby reducing the latency of such modified transactions. Any concurrent increase in latency for non-modified transactions is more than offset by the decreased latency of modified transactions, resulting in an overall reduction in system latency.

32 Claims, 3 Drawing Sheets

CIRCUIT ARRANGEMENT AND METHOD WITH STATE-BASED TRANSACTION SCHEDULING

FIELD OF THE INVENTION

The invention is generally related to computers and other data processing systems, and in particular to the scheduling of transactions between source and destination units in a data processing system.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible, e.g., static random access memory (SRAM) devices or the like. However, both memory speed and memory capacity are typically directly related to cost, and as a result, many computer designs must balance memory speed and capacity with cost.

A predominant manner of obtaining such a balance is to use multiple "levels" of memories in a memory system to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with SRAM's or the like. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

Another manner of increasing computer performance is to use multiple microprocessors operating in parallel with one another to perform different tasks at the same time. Often, the multiple microprocessors share at least a portion of the same memory system to permit the microprocessors to work together to perform more complex tasks. The multiple microprocessors are typically coupled to one another and to the shared memory by a system bus or other like interconnection network. By sharing the same memory system, however, a concern arises as to maintaining "coherence" between the various memory levels in the shared memory system —that is, ensuring that there are not multiple modified copies of any particular data in the system.

For example, in a given multi-processor environment, each microprocessor may have one or more dedicated cache memories that are accessible only by that microprocessor, e.g., level one (L1) data and/or instruction cache, a level two (L2) cache, and/or one or more buffers such as a line fill buffer and/or a transition buffer. Moreover, more than one microprocessor may share certain caches as well. As a result, any given memory address may be stored from time to time in any number of components in the shared memory system.

Coherency is maintained in many systems by maintaining "state" information that indicates the status of the data stored in different components of a system. Often, this information is stored locally with each component. Furthermore, to reduce the amount of state information, multiple memory addresses are often grouped together into lines or blocks having a common state.

As an example, many systems utilize a MESI coherence protocol that tags data stored in a component as one of four states: Modified, Exclusive, Shared, or Invalid. The modified state indicates that valid data for a particular group of memory addresses is stored in the component, and the component has the most recent copy of the data—i.e., all other copies, if any, are no longer valid. The Exclusive state indicates that valid data for a particular group of memory addresses is stored solely in the component, but the data has not been modified relative to the copy in the shared memory. The Shared state indicates that the valid data for a particular group of memory addresses is stored in the component, but that other valid copies of the data also exist in other components, including the main memory. The Invalid state indicates that no valid data for a particular group of memory addresses is stored in the component, although valid data may be stored in the main memory.

In many conventional implementations, accesses to memory addresses in a shared memory system are handled via transactions, which are typically packets of information transmitted from a source unit to a destination unit to perform a predetermined operation. As one example, separate request and response transactions may be used to maintain cache coherency and initiate the transfer of data between the different components in a system. A request transaction may be initiated by a source unit such as a microprocessor to request an access to data stored at a particular memory address, e.g., a load or read request or a store or write request. One or more destination units, e.g., another microprocessor, a cache and/or a system bus interface unit, receive and process the request. Each destination unit then functions as a source unit by issuing a response transaction back to the original source unit, typically indicating, based upon the state information for the requested memory address, whether or not the requested data is allocated to that unit. Also, if the requested data is allocated to that unit, the data is typically returned to the requesting unit in the response transaction. Furthermore, often the state information for each component in the system is updated in response to the operation being performed.

One difficulty that arises with transaction-based shared memory systems is that with multiple source and destination units, multiple transactions may need to be transmitted and processed at any given time across the interface between the different units. As a result, some mechanism to schedule transactions is typically required.

Conventional scheduling mechanisms typically implement some form of fairness algorithm, e.g., where transactions are transmitted and processed on a first-come, first-served basis, and where transactions that arrive at the same time are scheduled in a round-robin or random fashion. No explicit prioritization, except temporal, is typically utilized in scheduling transactions.

While a purely fair algorithm ensures that all transactions are eventually handled in a shared memory system, in many instances such an algorithm offers only moderate performance. As a result, a need has arisen for an improved scheduling algorithm that offers improved performance over conventional implementations.

SUMMARY OF THE INVENTION

The invention addresses these and other problems associated with the prior art by providing a data processing system, circuit arrangement, and method that rely on state information to prioritize certain transactions relative to other transactions when scheduling transactions in a data processing system. Based upon the particular implementation, prioritizing a particular type of transaction associated with a particular state relative to different transactions can reduce latency relative to simple fairness algorithms, thereby improving overall system performance.

A transaction scheduler consistent with the invention is configured to schedule the transmission of a first transaction from a source unit to a destination unit by prioritizing the first transaction relative to a second transaction based upon state information associated with at least one of the first and second transactions. The state information can be associated with a particular transaction based upon the current state of the data that is the focus of the transaction, and/or based upon the future state of the data that is to occur as a result of the transaction. Furthermore, in some implementations, the state information need not be the sole factor considered by a transaction scheduler. Instead, additional considerations such as fairness may also be considered, e.g., to ensure forward progress of all transactions.

State-based transaction scheduling consistent with the invention may be utilized in a number of applications. For example, it has been found that in many shared memory systems, cached data having a modified state is accessed more frequently than cached data having a non-modified state, e.g., an exclusive or shared state. As a result, by prioritizing transactions associated with modified cached data, the more frequent modified transactions are made more readily available, which often results in such transactions being handled more quickly and with reduced latency. Although such prioritization may also result in an increase in the latency for less frequent non-modified transactions, the overall transaction latency for the system is typically reduced due to the greater frequency of the prioritized modified transactions. Other potential applications for state-based transaction scheduling will become more apparent from a reading of the disclosure presented herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated implementations of the invention generally operate by prioritizing one pending transaction relative to another transaction based upon state information associated with at least one of the transactions. A transaction may represent any number of commands passed between a source unit and a destination unit in a data processing system. Examples of transactions include, but are not limited to, requests, replies, responses, broadcasts, etc. Moreover, transactions may be formatted as packets, sequences of commands/events, etc., depending upon the particular interface over which the transactions are forwarded between the source and destination units.

A source unit may represent practically any type of electronic component that can issue a transaction, and a destination unit may represent practically any type of electronic component that can receive and process a transaction. Moreover, an electronic component may also function as both a source unit and a destination unit. Examples of electronic components that may function as source and/or destination units include but are not limited to processors, memory controllers, bus controllers, bus arbiters, caches, cache controllers, cache directories, transition caches, snoop response logic, network controllers, main memory, or practically any type of fully or set associative buffer.

Moreover, it should be appreciated that source and destination units may be disposed within the same integrated circuit device, within separate integrated circuit devices interconnected with one another in the same computer, and/or within separate integrated circuit devices coupled to one another over a network such as a local-area, wide-area or global network. Furthermore, any source or destination unit may be implemented in more than one integrated circuit device in some implementations. Also, any number of interfaces may be used to interconnect a source and destination unit, including various bus architectures, direct connections, various networks and topologies, etc.

A transaction scheduler consistent with the invention may be used to schedule transactions from any number of source units to any number of destination units. Moreover, transaction scheduling may be implemented in whole or in part within different components in a data processing system. For example, a transaction scheduler may be disposed at least in part within a source unit to schedule the transmission of transactions out of the source unit. A transaction scheduler may also be disposed at least in part within a destination unit to gate the receipt of transactions into the destination unit. A transaction scheduler may also be disposed at least in part in an intermediate component coupled to the interface between one or more source units and one or more destination units, to gate the transmission of transactions between the source and destination units. It should also be appreciated that transaction scheduling may also be distributed among a plurality of units, e.g., within each source unit, and may include a mechanism for communicating between the various units to coordinate scheduling operations.

As discussed above, a transaction scheduler consistent with the invention is configured to schedule transactions by prioritizing transactions based upon state information. One principal category of state information is the state information used to maintain coherency in a shared memory system, and it is upon this category of state information that the disclosure hereinafter is focused. However, it should be appreciated that other categories of state information may also be used, e.g., page faults, cacheable v. non-cacheable, and write through v. store in, etc.

Coherency-based state information may include, for example, the modified, exclusive, shared and invalid states defined under the MESI protocol, as well as other states, e.g., owner, shared owner, pending, filling, etc. In the embodiment discussed in greater detail below, the shared, exclusive and invalid states may jointly be considered to be "non-modified" states to distinguish the modified state from the other three, as it is the distinction between the modified and non-modified states that the embodiment exploits to enhance the performance of a data processing system.

Specifically, it has been found through simulation analysis that in many multi-processor shared memory systems, the number of accesses to modified cache blocks is typically greater than the number of accesses to non-modified cache blocks. Table I, for example, lists the percentages of references to modified and non-modified cache blocks for several known benchmarks simulated on a hypothetical system having four processors $P_0$, $P_1$, $P_2$ and $P_3$, and an infinite write-invalidate type cache having a block size of 64 bytes:

TABLE I

Simulation Analysis

| Benchmark | Block State | Cache Hits to State x Block/ Total References | | | | |
|---|---|---|---|---|---|---|
| | | $P_0$ | $P_1$ | $P_2$ | $P_3$ | Total |
| BUK | Modified | 51.55 | 0.02 | 0.02 | 0.02 | 51.60 |
| | Non-Modified | 4.26 | 14.70 | 14.70 | 14.70 | 48.35 |
| CGM | Modified | 21.91 | 12.53 | 12.64 | 12.80 | 59.87 |
| | Non-Modified | 3.94 | 11.93 | 11.96 | 11.91 | 39.74 |
| MGRID | Modified | 19.87 | 17.08 | 16.89 | 17.52 | 71.36 |
| | Non-Modified | 5.72 | 7.68 | 7.85 | 7.23 | 28.47 |
| RADIX | Modified | 18.71 | 18.64 | 18.67 | 18.65 | 74.67 |
| | Non-Modified | 6.29 | 6.24 | 6.29 | 6.26 | 25.08 |
| FFT | Modified | 36.74 | 14.46 | 14.17 | 14.02 | 79.38 |
| | Non-Modified | 13.76 | 1.88 | 2.17 | 2.31 | 20.13 |
| LU | Modified | 20.20 | 17.00 | 18.05 | 16.20 | 71.45 |
| | Non-Modified | 8.70 | 5.97 | 6.00 | 7.86 | 28.52 |

The BUK benchmark tests a sorting operation used in particle method codes, and tests integer computation speed and communication performance. Floating point arithmetic is not involved, but significant data communication is required. The CGM benchmark uses a conjugate gradient method to compute an approximation to the smallest eigen-value of a large, sparse, symmetric positive definite matrix, employing sparse matrix vector multiplication. The MGRID benchmark solves a 3D Poisson PDE, and is typically used to test both short and long distance highly structured communication. The RADIX benchmark is an iterative integer radix sort algorithm, and the FFT benchmark is a Fast Fourier Transform algorithm. The LU benchmark factors a dense matrix into the product of a lower triangular and an upper triangular matrix. Each of the above benchmarks is well known in the art. See, e.g. Saini, Subhash et al., "NAS Parallel Benchmarks Results 3-95," Report NAS-95-011 (4/95), and Woo, Steven Cameron et al., "The SPLASH-2 Programs: Characterization and Methodological Considerations," *Proceedings of the $22^{nd}$ Annual International Symposium on Computer Architecture*, pp. 24–36 (6/95).

As may be seen from Table I, in every instance, with the exception of processors $P_1$, $P_2$ and $P_3$ for the BUK benchmark, modified cache blocks are accessed more frequently than non-modified cache blocks. Thus, it is believed that performance in most situations would be improved by prioritizing modified transactions over non-modified transactions.

State information can be associated with a particular transaction based upon the current state of the data that is the focus of the transaction, and/or based upon the future state of the data that is to occur as a result of the transaction. For example, in the embodiment discussed below, a transaction is considered to be a modified transaction, associated with the modified state, if that transaction leads to a cache line or block in the modified state upon completion of the transaction. A transaction is considered to be a non-modified transaction if that transaction leads to a cache line or block being in the shared or exclusive state. Other manners of associating transactions with states may be used in the alternative.

Assuming, for example, the use of separate request and reply transactions to initiate data transfers and maintain cache coherency, a modified request may be considered to be a request that leads to a cache line being in a modified state, e.g., an atomic or non-atomic cacheable store that misses the cache, or an atomic or non-atomic cacheable store that hits a cache line in any state but modified. Similarly, a modified reply may be considered to be a reply that is used for supplying a cache line that is modified or will be modified, or for confirming ownership, e.g., a reply to a store miss, or a cache line write-back due to a snoop. In addition, a modified intervention, or direct cache to cache transfer, where a snooped load or store miss hits a modified cache line, may also be considered to be a modified transaction.

A non-modified request may be considered to be a request that leads to a cache line being in the shared or exclusive state, e.g., an atomic or non-atomic cacheable load that misses the cache. A non-modified reply may be considered to be a reply that is used for supplying a cache line that won't be modified, e.g., a reply to a load miss, or a cache line write-back snoop. In addition, a shared intervention, or direct cache to cache transfer, where a snooped load or store miss hits a cache line in a non-modified state, may also be considered to be a non-modified transaction.

In some implementations, it may be desirable to always prioritize one type of transaction over other transactions. However, in other implementations, it may be desirable to also incorporate some fairness concepts secondary to the state-based prioritization to protect against excessive latency for non-prioritized transactions. For example, different fairness algorithms may also be used to supplement a state-based scheduling algorithm, e.g., round-robin algorithms, FIFO algorithms, longest processing time first algorithms, shortest processing time first algorithms, random algorithms, and variable interrupt priority based on last device serviced algorithms, among others. Moreover, while the discussion hereinafter focuses on prioritization between two classes of states, additional prioritization may be used in other implementations to prioritize transactions based upon three or more distinct classes states. Other manners and variations of scheduling algorithms will become apparent to one of ordinary skill in the art upon a further review of the disclosure presented herein.

Figure 1:
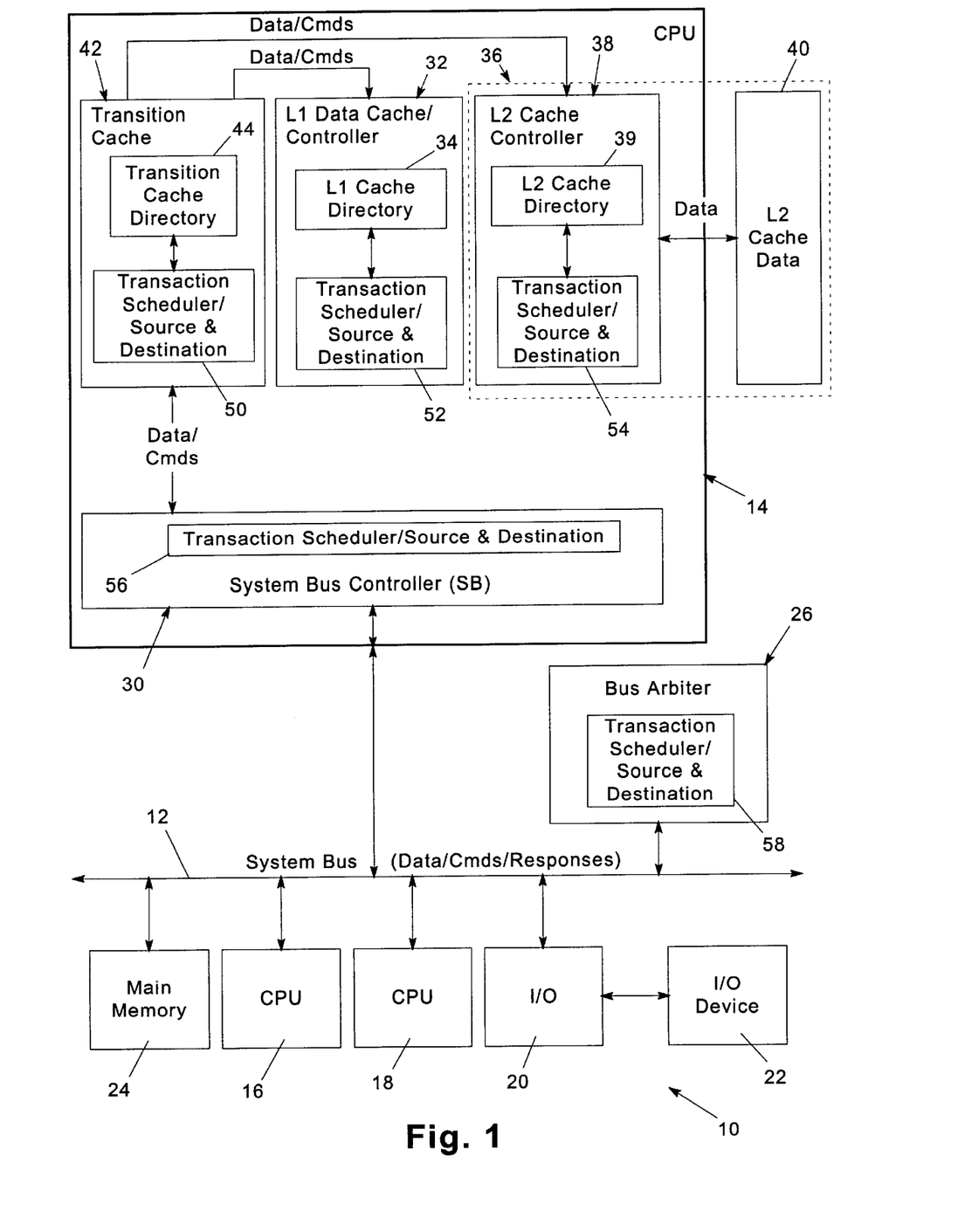
FIG. 1 is a block diagram of a data processing system consistent with the invention.

Turning now to the Drawings, wherein like numbers denote like parts throughout the several views, FIG. 1 illustrates the general configuration of an exemplary data processing system 10 consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes a system bus 12 that couples together a plurality of electronic components, e.g., central processing units (CPU's) 14, 16 and 18, and input/output controller 20—which couples the bus to one or more input/output devices such as I/O device 22—with a shared memory system such as represented by a main memory 24. The data processing system 10 typically includes an addressable memory address space including a plurality of memory addresses. The actual data stored at such memory addresses may be maintained in main memory 24, or may be selectively paged in and out of main memory 24, e.g., into a direct access storage device (DASD) (not shown). Moreover, copies of selective portions of the memory addresses in the memory space may also be duplicated in various memories found in the various electronic components 14–20 coupled to system bus 12. The system bus acts as a shared memory interface that permits the various electronic components to share main memory 24 in a controlled fashion, and in this regard, a bus arbiter 26 is typically used to selectively control the access to the bus by each of the electronic components to prevent collisions between the components from occurring. In other embodiments, however, it should be appreciated that bus arbitration may be implemented in a distributed manner with suitable logic disposed in each component coupled to the system bus.

For caching purposes, the memory address space is partitioned into a plurality of cache lines, or contiguous sequences of memory addresses that are always swapped into and out of caches as single units. By organizing memory addresses into defined cache lines, decoding of memory addresses in caches is significantly simplified, thereby significantly improving cache performance. By stating that a sequence of memory addresses forms a cache line, however, no implication is made whether the sequence of memory addresses are actually cached at any given time.

CPU 14 includes a system bus controller 30 that provides an interface between the system bus and one or more local memories, including a level one (L1) data cache 32 with a cache directory 34; a level two (L2) cache 36 with an integrated cache controller 38 and cache directory 39 and an off-chip cache memory device 40; and a transition cache 42 with a cache directory 44. An L1 instruction cache may also be provided (not shown), and L1 data cache 32 may alternatively be implemented as a combined data/instruction cache. Moreover, it should be appreciated that any of the various caches may be completely integrated into a common integrated circuit device (e.g., with caches 32, 42), or may be partially or completely integrated on separate integrated circuit devices from CPU 14 (e.g., with cache 36). Moreover, it should be appreciated that CPU 14 also utilizes a number of additional components that have been omitted from FIG. 1 for ease of understanding, e.g., an instruction unit, a fixed point unit, a floating point unit, etc. In general, it should be appreciated that a wide variety of suitable hardware implementations may be used in the alternative.

Data processing system 10 implements a snoopy coherence mechanism that permits any component 14–20 to issue memory access requests that may access information stored in any other such component, and in response, updates the state of the memory address(es) in each memory that is affected by the memory access requests. Memory access request transactions are issued from source units that require read or write access to memory address(es) stored in the shared memory system. These transactions are received by destination units that determine the state of the memory address(es) in each memory that are the subject of the requests, and outputs suitable local response signals, functioning as reply transactions, that are representative of the states of the various memories. The requested data is also typically provided in connection with such replies, if the requested data is available from the responding memory. In addition, the state of a memory address in each memory is also typically updated in response to the request transaction.

In operation, data processing system 10 maintains coherence through a multi-level coherence mechanism that relies on appropriate requests and replies transferred between the various memories within a source component, as well as between multiple components in the shared memory system as necessary. Coherency is maintained first at a local level within a given component, and then at a more global level between all components in the system.

As an example, assume a load instruction processed by the processor misses L1 data cache 32. In that instance, the load miss is passed as a load transaction to transition cache 42, which then forwards a load transaction to L2 cache 36. Assuming, for example, that the load also misses the L2 cache. A reply to the load transaction is then returned to the transition cache, resulting in the transition cache forwarding a load transaction to system bus controller 30. The system bus controller then requests access to the system bus by forwarding a load transaction to bus arbiter 26, which grants access to the bus to the system bus controller. The load transaction is then forwarded to main memory, which services the transaction and forwards the requested data to system bus controller 30 via a reply transaction. The controller then forwards the data to the transition cache via another reply transaction, and the transition cache in turn forwards the data to the L1 and L2 caches via additional reply transactions. Processing of the load miss is then complete. A store miss is also handled in a similar manner, with the exception that, once the requested data is placed in the L1 and L2 caches, the data is updated with the write data from the store transaction.

Given the distributed nature of the various memories in the shared memory system, a number of transactions may be pending in different points of the system at the same time. As a result, transaction handling is required to route these transactions within each component, as well as between the different components. Within each component, as represented for example by CPU 14, each of L1 cache 32, L2 cache 36, and transition cache 42 functions as a source unit, from which transactions are issued, and a destination unit, in which transactions from other caches are received. In addition, each cache 32, 36 and 42 requires transaction scheduling logic to handle collisions between multiple transactions pending for any given cache. This combined functionality for each of components 32, 36 and 42 is therefore respectively represented by transaction scheduler/source & destination blocks 50, 52 and 54.

Between components, the transaction handling functionality is distributed among the various components coupled to system bus 12. For CPU 14, for example, system bus controller 30 includes a transaction scheduler/source & destination block 56. Other components on the bus include logic circuitry similar in finctionality to block 56, e.g., transaction scheduler/source & destination block 58 for bus arbiter 26. Not shown is additional transaction handling circuitry used in the other components such as main memory 24, CPU's 16 and 18 and I/O component 20. Such additional circuitry would be similar in configuration to the circuitry implemented in CPU 14 and bus arbiter 26, although some components may function solely as sources or destinations as appropriate.

As should be apparent from the foregoing, an innumerable number of alternate hardware arrangements may be utilized to implement a transaction scheduling mechanism consistent with the invention. Moreover, as is well known in the art, such hardware arrangements may be implemented in circuit arrangements comprising one or more integrated circuit devices, not to mention other support circuitry. It will also be appreciated that integrated circuit devices and the like are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

With each block 50–58, transaction scheduling is performed to prioritize one class of transaction relative to another class of transaction. In the illustrated embodiment, this scheduling is distributed among blocks 50–58 to permit multiple transactions to be processed concurrently in different areas of the system. In other embodiments, transaction scheduling may be more centralized, e.g., in a single router through which all transactions pass. However, by distributing the scheduling, greater transaction throughput is typically realized. Thus, for example, if both a store miss and a load miss are pending in the L1 cache, prioritization of the store miss over the load miss merely results in handling of the store miss being kicked off prior to the load miss. Completion of the store miss prior to initiating the load miss, however, is not required.

Figure 2:
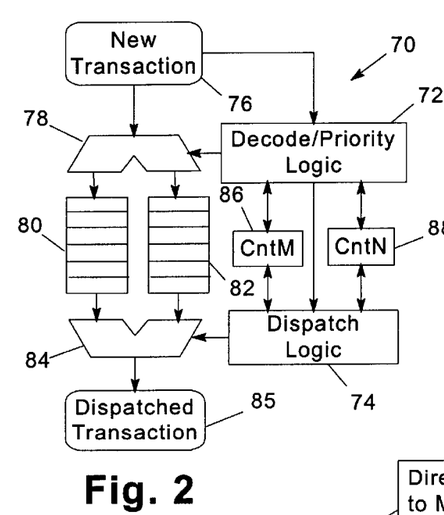
FIG. 2 is a block diagram of a transaction scheduler suitable for use in the data processing system of FIG. 1.

A transaction scheduler suitable for use in any of blocks 50–58 of FIG. 1 is illustrated at 70 in FIG. 2. The primary decision logic in transaction scheduler 70 is partitioned into a decode/priority logic block 72 and a dispatch logic block 74. A new transaction, suitable for transmission from a source unit to a destination unit, is illustrated at 76, and is provided to decode/priority logic block 72, as well as to a demultiplexer 78 that routes the transaction, responsive to a control signal from logic block 72, to one of two first-in-first-out (FIFO) queues 80, 82. Queues 80, 82 respectively represent modified and non-modified queues for storing pending modified and non-modified transactions, respectively. Each queue 80, 82 outputs to a multiplexer 84 that outputs a pending transaction of one of the queues (represented as dispatched transaction 85) responsive to a control signal from dispatch logic 74. Logic blocks 72, 74 each utilize a set of counters 86, 88, with counter 86 being a modified transaction counter "CntM" that maintains a count of the number of pending transactions in modified queue 80, and with counter 88 being a non-modified transaction counter "CntN" that maintains a count of the number of pending transactions in non-modified queue 82. A priority control signal is also output from block 72 to block 74 to control how the dispatch logic prioritizes transactions.

Figure 3:
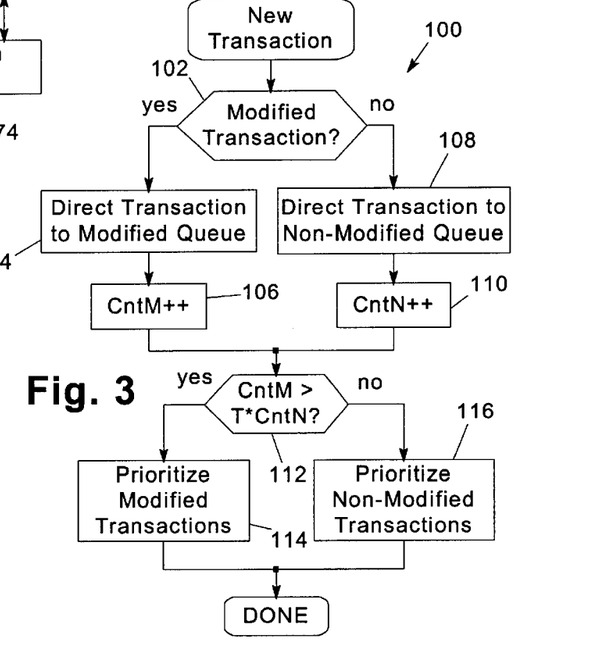
FIG. 3 is a flowchart illustrating the sequence of operations performed by the decode/priority logic of FIG. 2.

FIG. 3 illustrates at 100 a flowchart of one suitable program flow for decode/priority logic block 72. Responsive to receipt of a new transaction at 76, block 102 first determines whether the new transaction is a modified or non-modified transaction, typically by looking at the transaction type and expected resulting state of the transaction, as discussed above. If the transaction is a modified transaction, control passes to block 104 to direct the transaction to the modified queue, typically by asserting an appropriate control signal to demultiplexer 78 (FIG. 2). Next, the modified counter is incremented in block 106 to indicate another pending transaction in the modified queue. Returning to block 102, if the new transaction is a non-modified transaction, control passes to block 108 to direct the transaction to the non-modified queue via asserting the appropriate control signal to the demultiplexer, and then to block 110 to increment the non-modified counter.

Regardless of whether the transaction is a modified or non-modified transaction, control passes from either of blocks 106, 110 to block 112 to determine which of modified and non-modified transactions to prioritize based upon the current state of the queues. Specifically, block 112 implements a state-based scheduling algorithm, which in the illustrated embodiment also incorporates a fairness factor to ensure that the latency of non-modified transactions does not increase above an unacceptable level. Then, based upon the outcome of the scheduling algorithm, either of blocks 114, 116 is executed to prioritize either modified or non-modified transactions. Processing of the new transaction by logic block 72 is then complete.

In this implementation, the scheduling algorithm is performed by comparing the value of the modified counter to the value of the non-modified counter. It may also be desirable to adjust this comparison to favor one type of transaction over the other to a different extent, e.g., by scaling the value of the non-modified counter by a scaling factor T. The scaling factor may be selected based upon simulation or empirical analysis to provide a desirable tradeoff between modified and non-modified latencies. It should also be appreciated that the comparison may also be modified dynamically to optimize performance for different workloads, e.g., in response to monitoring of the relative latencies of modified and non-modified transactions. The scaling factor may also be hardwired into a given design, or may be programmable, e.g., to adapt a particular design for different workloads. As one implementation, it may be desirable to provide an internal register for use in programming the scaling factor, among other alternatives.

It should be appreciated that other scheduling algorithms may be used in the alternative. For example, an algorithm that always prioritizes modified transactions may be used. Other fairness based algorithms may also be used. For example, only the non-modified counter could be monitored so that the number of pending non-modified transactions is kept below an acceptable maximum regardless of the number of pending modified transactions. Furthermore, any of the other fairness concepts discussed above may be incorporated into the scheduling algorithm in the alternative.

Figure 4:
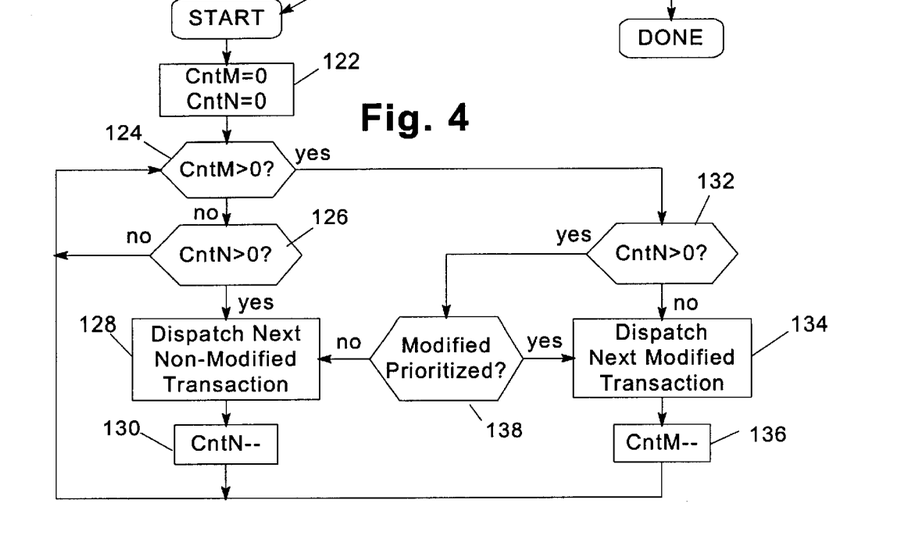
FIG. 4 is a flowchart illustrating the sequence of operations performed by the dispatch logic of FIG. 2.

FIG. 4 illustrates at 120 a flowchart of one suitable program flow for dispatch logic block 74 of FIG. 2. Upon startup, block 122 is executed to initialize the modified and non-modified counters to zero. Next, an endless loop is initiated in block 124 to continuously dispatch transactions pending in each of the queues 80, 82 (FIG. 2). Block 124 determines whether any transaction is pending in the modified queue by determining whether a non-zero value is stored in the modified counter. Assuming first the situation where no transaction is pending in the modified queue, block 124 determines that the value stored in the modified counter is zero, and passes control to block 126 to determine whether a non-zero value is stored in the non-modified counter.

If the non-modified counter contains a value of zero, no transaction is pending in the non-modified queue, so control passes back to block 124. If, however, a non-zero value is returned, a pending non-modified transaction is waiting to be dispatched. Furthermore, from block 124, it is known that no conflicting modified transaction is also pending. Therefore, control may pass to block 128 to dispatch the next non-modified transaction from the non-modified queue, typically by asserting an appropriate control signal to multiplexer 84. At this time, the transaction is flushed from the queue, and block 130 is executed to decrement the non-modified counter to indicate removal of the transaction from the queue. Control then returns to block 124.

Returning to block 124, if a non-zero value is stored in the modified counter, control passes to block 132 to determine whether a non-zero value is stored in the non-modified counter. If the non-modified counter contains a value of zero, no transaction is pending in the non-modified queue, so it is known that no conflict exists, and the next pending modified transaction can be dispatched without a conflict. Therefore, control may pass to block 134 to dispatch the next modified transaction from the modified queue, typically by asserting an appropriate control signal to multiplexer 84. At this time, the transaction is flushed from the queue, and block 136 is executed to decrement the modified counter to indicate removal of the transaction from the queue. Control then returns to block 124.

Returning to block 132, if a non-zero value is returned from the non-modified counter, both a modified and a non-modified transaction are waiting to be dispatched. Thus, control passes to block 138 to resolve the conflict based upon which type of transaction is currently prioritized by the decode/priority logic (represented by the priority control signal from block 72 to block 74 of FIG. 2). If modified transactions are prioritized, block 138 passes control to block 134 to dispatch the modified transaction in the manner discussed above. However, if non-modified transactions are prioritized, block 138 passes control to block 128 to dispatch the non-modified transaction instead.

Figure 5:
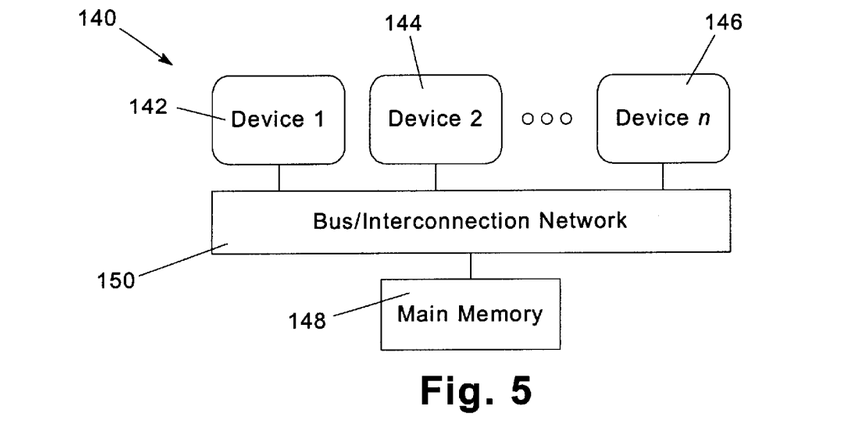
FIG. 5 is a block diagram of a first shared memory environment suitable for use consistent with the invention, utilizing a shared main memory architecture.
Figure 6:
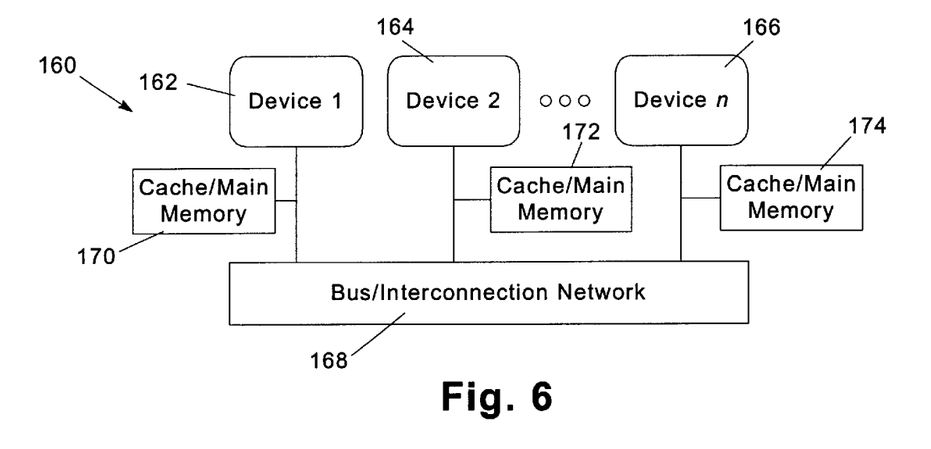
FIG. 6 is a block diagram of a second shared memory environment suitable for use consistent with the invention, utilizing either a distributed and shared memory architecture or a cache-only memory access (COMA) memory architecture.

The transaction scheduling mechanism described herein may be utilized in any number of shared memory systems consistent with the invention. In addition to that illustrated in connection with FIG. 1 above, several other suitable environments are illustrated in FIGS. 5 and 6. For example, a data processing system 140 shown in FIG. 5 ay include a plurality of devices 142, 144 and 146 that are coupled to a main memory 148 through a bus/interconnection network 150. Data processing system 140 is an example of a memory system architecture whereby all devices share a common main memory, and thus, coherence must be maintained between any of the memories in devices 142, 144 and 146. In this environment, each of devices 142, 144 and 146 typically functions as both a source and a destination unit to maintain coherence between the various memories in the devices. Main memory 148 typically functions only as a destination unit in this context. It should be appreciated that suitable transaction scheduling circuitry consistent with the invention may be disposed within bus or interconnection network 150, or may be distributed among one or more of devices 142–146 and main memory 148, to handle coherence maintenance as necessary for the implementation of the shared memory system.

FIG. 6 illustrates an example of another data processing system 160 representative of both a distributed and shared memory system architecture, and a cache only memory access (COMA) system architecture, depending upon the particular type of memory assigned to each device. System 160 includes a plurality of devices 162, 164 and 166 that are interconnected with one another via a bus/interconnection network 168. However, rather than sharing a common main memory, each device has associated therewith its own memory, e.g., memory 170 for device 162, memory 172 for device 164 and memory 174 for device 166. When each memory 170, 172, 174 is implemented as a portion of main memory, the system represents a distributed and shared memory system architecture. However, when each memory 170, 172, 174 is implemented as a cache memory, the system represents a cache only memory access (COMA) memory system architecture, the operation of which is well known in the art. In either event, as with the shared memory architecture described above, each of devices 162, 164 and 166, as well as memories 170, 172 and 174, can function as a source and/or destination unit. Furthermore, transaction scheduling circuitry may be distributed among any of such devices, memories and network 168, as will be apparent to one of ordinary skill in the art.

Figure 7:
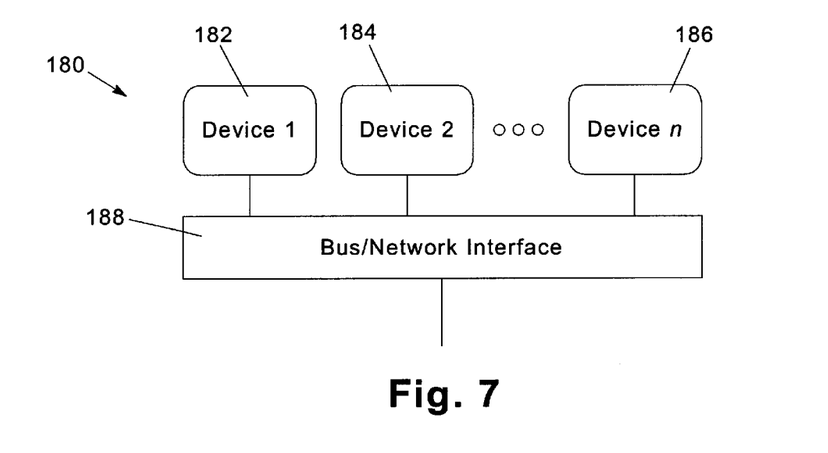
FIG. 7 is a block diagram of an integrated circuit device implementing multiple source/destination units consistent with the invention.

Furthermore, as discussed above, transaction scheduling may also be implemented in a multi-level format, whereby multiple devices may be integrated into a given electronic device or integrated circuit device therein to maintain coherence between a plurality of memories integrated in such a device. FIG. 7 illustrates, for example, a circuit arrangement 180 representing a single integrated circuit device within which may be defined multiple devices 182, 184 and 186 that are interfaced with a bus/network interface block 188. Circuit arrangement 180 of FIG. 7, is, for example, similar in architecture to CPU 14 of FIG. 1. It should be appreciated that circuit arrangement 180 may thus be used in any of the devices in any of data processing systems 140 or 160 of FIGS. 5–6 to provide such a multi-level transaction scheduling mechanism.

Transaction scheduling consistent with the invention may be utilized in other environments. For example, some network environments, such as local and wide area networks, may benefit from state-based transaction scheduling. Other environments, such as storage area networks (among others), may also benefit from state-based transaction scheduling as will be apparent to one of ordinary skill in the art upon a review of the disclosure herein.

Various additional modifications may be made to the illustrated embodiments without departing from the spirit and scope of the invention. Therefore, the invention lies in the claims hereinafter appended.

What is claimed is:

1. A circuit arrangement comprising:
   (a) a source unit configured to issue a first transaction;
   (b) a destination unit configured to receive the first transaction; and
   (c) a transaction scheduler configured to schedule the transmission of the first transaction from the source unit to the destination unit by prioritizing the first transaction relative to a second transaction based upon state information associated with the first and second transactions, wherein the transaction scheduler includes a modified queue configured to receive modified memory access request transactions and modified memory access reply transactions issued by the source unit and a non-modified queue configured to receive non-modified memory access request transactions issued by the source unit, wherein the first transaction is selected from the group consisting of a modified memory access request transaction and a modified memory access reply transaction, and wherein the transaction scheduler is configured to place the first transaction in the modified queue based upon state information associated with the first transaction that characterizes the first transaction as a modified transaction.

2. The circuit arrangement of claim 1, wherein the source unit is further configured to issue the second transaction, and wherein the transaction scheduler is coupled to the source unit to prioritize the transmission of the first transaction by the source unit relative to transmission of the second transaction by the source unit.

3. The circuit arrangement of claim 1, wherein the transaction scheduler is coupled to the destination unit to prioritize the receipt of the first transaction by the destination unit relative to receipt of the second transaction by the destination unit.

4. The circuit arrangement of claim 3, further comprising a second source unit configured to issue the second transaction.

5. The circuit arrangement of claim 1, wherein the transaction scheduler is coupled intermediate to the source and destination units, and wherein the transaction scheduler is configured to receive the first and second transactions and transmit the first transaction to the destination unit prior to transmitting the second transaction.

6. The circuit arrangement of claim 1, wherein the source and destination units are coupled to one another in a shared memory system, and wherein the first transaction is a coherence transaction for use in maintaining coherence within the shared memory system.

7. The circuit arrangement of claim 6, wherein the state information indicates a modified state of at least one memory address stored in the destination unit upon completion of at least one of the first and second transactions.

8. The circuit arrangement of claim 7, wherein the transaction scheduler is configured to prioritize the first transaction relative to the second transaction responsive to the first transaction being a modified transaction that results in a modified state for a memory address stored in the destination unit, and the second transaction being a non-modified transaction that results in a non-modified state for a memory address stored in the destination unit.

9. The circuit arrangement of claim 1, wherein the non-modified queue is further configured to receive non-modified memory access reply transactions issued by the source unit.

10. The circuit arrangement of claim 1, wherein the transaction scheduler is further configured to prioritize the first transaction relative to the second transaction only if fairness is satisfied.

11. The circuit arrangement of claim 1, wherein the transaction scheduler is further configured to prioritize the first transaction relative to the second transaction using a programmable scheduling algorithm.

12. The circuit arrangement of claim 11, further comprising a programmable register configured to store a scaling factor for use in adjusting the programmable scheduling algorithm for the transaction scheduler.

13. The circuit arrangement of claim 1, wherein each of the source and destination units is selected from the group consisting of a processor, a memory controller, a bus controller, a bus arbiter, a cache, a cache controller, a cache directory, a transition cache, snoop response logic, a network controller, a main memory, a fully associative buffer, and a set associative buffer.

14. The circuit arrangement of claim 1, wherein the source and destination units are disposed within the same integrated circuit device.

15. The circuit arrangement of claim 1, wherein the source and destination units are disposed within separate integrated circuit devices.

16. A circuit arrangement comprising:
   (a) a shared memory system including a plurality of components, each component configured as at least one of a source unit and a destination unit, each source unit configured to issue at least one of a modified transaction and a non-modified transaction to maintain coherency in the shared memory system, and each destination unit configured to receive transactions from a source unit, wherein each modified transaction is selected from the group consisting of a memory access request transaction and a memory access reply transaction, and wherein at least one non-modified transaction is a memory access request transaction; and
   (b) a transaction scheduler configured to schedule the transmission of transactions from at least one source unit to at least one destination unit by prioritizing at least one modified transaction relative to a non-modified transaction, wherein the transaction scheduler includes a modified queue configured to receive each pending modified memory access request transaction and each modified memory access reply transaction issued by at least one source unit and a non-modified queue configured to receive each pending non-modified memory access request transaction issued by the at least one source unit.

17. The circuit arrangement of claim 16, wherein the transaction scheduler further includes transaction dispatch logic circuitry, coupled to the queues, the transaction dispatch logic circuitry configured to prioritize modified transactions relative to non-modified transactions only if a count of pending non-modified transactions does not exceed a predetermined threshold.

18. The circuit arrangement of claim 17, wherein the transaction dispatch logic circuitry is configured to determine that the count of pending non-modified transactions does not exceed the predetermined threshold by comparing the count of the pending non-modified transactions with a count of pending modified transactions.

19. The circuit arrangement of claim 18, wherein the transaction dispatch logic circuitry is further configured to scale at least one of the counts of the pending modified and non-modified transactions by a programmable scaling factor when determining that the count of pending non-modified transactions does not exceed the predetermined threshold.

20. The circuit arrangement of claim 16, wherein each component is selected from the group consisting of a memory, a cache, a processor, a bus controller, and a bus arbiter.

21. The circuit arrangement of claim 16, wherein each non-modified transaction is selected from the group consisting of a memory access request transaction and a memory access reply transaction, and wherein the non-modified queue is further configured to receive each pending non-modified memory access reply transaction issued by the at least one source unit.

22. A data processing system, comprising:
(a) a plurality of processors coupled to a shared memory over a system bus, each processor including at least one cache, and the system bus under control of a bus arbiter, each processor, shared memory and the bus arbiter configured as at least one of a source unit and a destination unit, each source unit configured to issue at least one of a modified transaction and a non-modified transaction to maintain coherency in the shared memory system, and each destination unit configured to receive transactions from a source unit, wherein each modified transaction is selected from the group consisting of a memory access request transaction and a memory access reply transaction, and wherein at least one non-modified transaction is a memory access request transaction; and
(b) transaction scheduling logic disposed within at least one of a processor, shared memory and the bus arbiter and configured to schedule the transmission of transactions from at least one source unit to at least one destination unit by accessing state information associated with at least one transaction and prioritizing at least one modified transaction relative to a non-modified transaction based upon such state information, wherein the transaction scheduling logic includes a modified queue configured to receive each modified memory access request transaction and each modified memory access reply transaction issued by at least one source unit and a non-modified queue configured to receive each non-modified memory access request transaction issued by the at least one source unit.

23. A method of scheduling transactions, the method comprising:
(a) receiving first and second transactions from at least one source unit; and
(b) in a transaction scheduler, prioritizing processing in at least one destination unit of the first transaction relative to the second transaction based upon state information associated with the first and second transactions, wherein the transaction scheduler includes a modified queue configured to receive modified memory access request transactions and modified memory access reply transactions issued by the at least one source unit and a non-modified queue configured to receive non-modified memory access request transactions issued by the at least one source unit, wherein the first transaction is selected from the group consisting of a modified memory access request transaction and a modified memory access reply transaction, and wherein the transaction scheduler is configured to place the first transaction in the modified queue based upon state information associated with the first transaction that characterizes the first transaction as a modified transaction.

24. The method of claim 23, wherein prioritizing processing of the first transaction relative to the second transaction includes controlling the order of transmission of the first and second transactions from the same source unit.

25. The method of claim 23, wherein prioritizing processing of the first transaction relative to the second transaction includes controlling the order of processing of the first and second transactions received by the same destination unit.

26. The method of claim 23, wherein receiving the first and second transactions includes receiving the first transaction from a first source unit and receiving the second transaction from a second source unit, and wherein prioritizing processing of the first transaction relative to the second transaction includes controlling the order of transmission of the first and second transactions over a common interface.

27. The method of claim 23, wherein the source and destination units are coupled to one another in a shared memory system, and wherein the first and second transactions are coherence transactions for use in maintaining coherence within the shared memory system.

28. The method of claim 23, wherein prioritizing processing of the first transaction relative to the second transaction includes determining whether fairness is satisfied.

29. The method of claim 23, wherein each of the source and destination units is selected from the group consisting of a processor, a memory controller, a bus controller, a bus arbiter, a cache, a cache controller, a cache directory, a transition cache, snoop response logic, a network controller, a main memory, a fully associative buffer, and a set associative buffer.

30. The method of claim 23, wherein the non-modified queue is further configured to receive non-modified memory access reply transactions issued by the source unit.

31. A method of scheduling transactions issued in a shared memory system, the method comprising:
(a) receiving memory access request transactions and memory access reply transactions from at least one of a plurality of source units;
(b) directing each received transaction to one of a modified queue and a non-modified queue based upon whether such received transaction is a modified transaction, including directing each modified memory access request transaction and each modified memory access reply transaction to the modified queue, and directing each non-modified memory access request transaction to the non-modified queue; and
(c) controlling a dispatch of transactions from the modified and non-modified queues to prioritize processing in at least one of a plurality of destination units of at least one modified transaction relative to a non-modified transaction.

32. The method of claim 31, wherein directing each received transaction to one of a modified queue and a non-modified queue based upon whether such received transaction is a modified transaction further includes directing each non-modified memory access reply transaction to the non-modified queue.

* * * * *